June 27, 1933.    B. Q. JONES    1,915,319
WIND INDICATING AIRWAYS BEACON
Filed Oct. 11, 1929
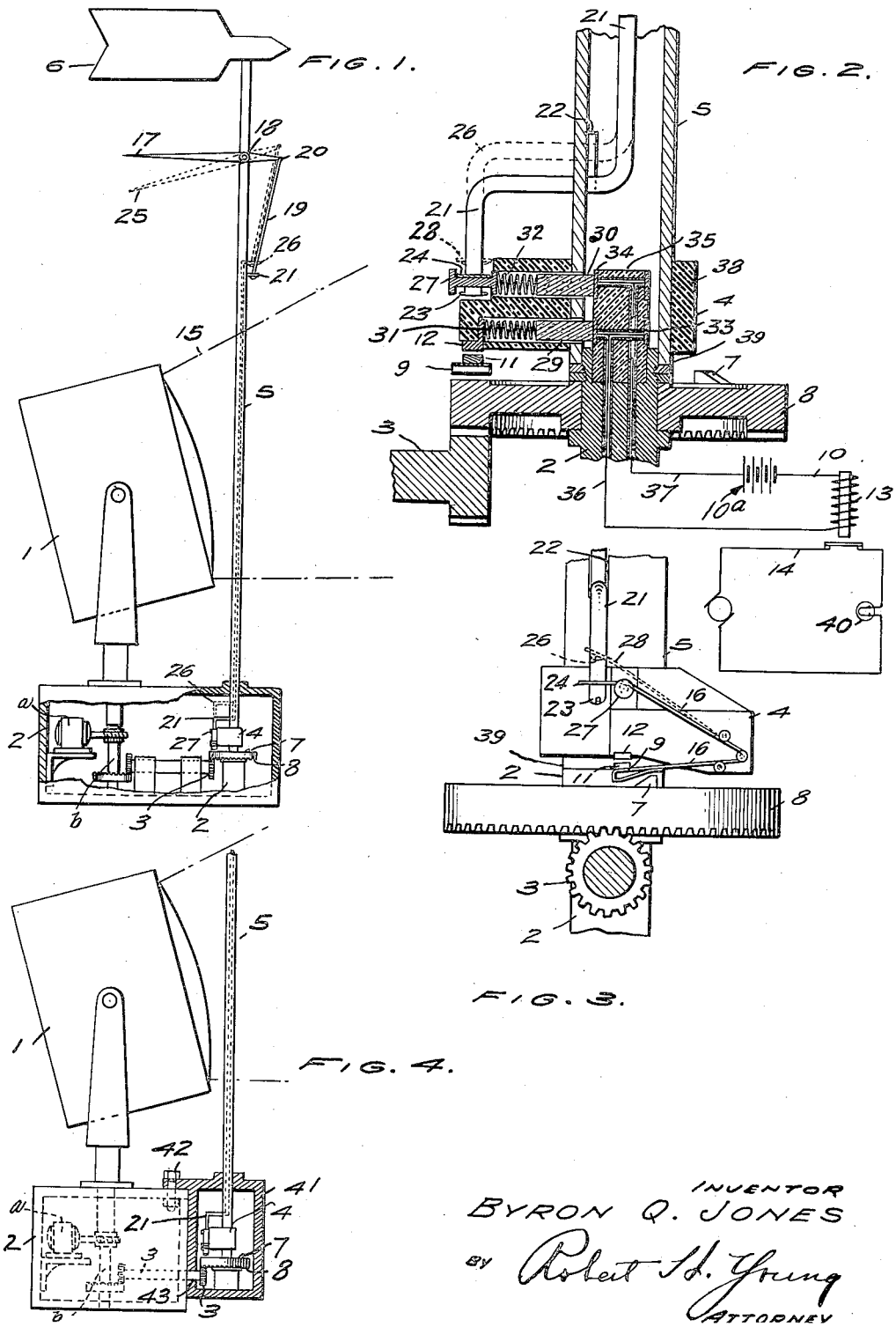

Patented June 27, 1933

1,915,319

UNITED STATES PATENT OFFICE

BYRON Q. JONES, OF WASHINGTON, DISTRICT OF COLUMBIA

WIND INDICATING AIRWAYS BEACON

Application filed October 11, 1929. Serial No. 399,036.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to wind indicators in general, the broad object in view being to produce a momentary diminution in the light intensity of the beam of light of a revolving beacon at the moment when the beam is projected in a direction parallel to the wind direction.

Other objects of the invention are to provide an indication of changes in the velocity of the wind and to provide a beacon light wind signal that does not interfere with the visibility of the beacon light.

In the accompanying drawing:

Fig. 1 shows the device in partial cross-section in operative relation with a revolving beacon.

Fig. 2 is an enlarged cross-section view of the current interrupter together with a wiring diagram of the device.

Fig. 3 is an enlarged side view of Fig. 2.

Fig. 4 shows the device in partial cross-section as an attachment to a revolving beacon.

Referring to the figures more particularly by reference numerals, 1 designates a beacon mounted on a base 2 for rotation about a vertical axis, any conventional means, such as an electric motor $a$ geared with the beacon shaft $b$, being employed to rotate the beacon in the customary manner. For the purposes of the present invention, the beacon shaft $b$ is connected by gear train 3 to an electric make and break mechanism 4 fixedly attached to rod 5 which turns with the wind thru the action of the wind upon wind vane 6 fixedly attached to rod 5. The rotation of revolving beacon 1 actuates gear train 3 such that when cam 7 on gear 8 passes under breaker 9 (Figs. 2 and 3) of make and break mechanism 4 electric circuit 10 is momentarily closed by the contact of breaker point 11 with breaker point 12 which circuit closing actuates relay 13 and causes a momentary opening of lamp circuit 14, thereby correspondingly reducing the intensity of the light of lamp 40 of revolving beacon 1 and hence of light beam 15. From the drawing it is apparent this reduction in the light intensity of lamp 40 and of light beam 15 is only momentary and occurs only in that sector of the beacon's revolution having a fixed relation with respect to the direction of the wind. As gear 8 carries cam 7 past breaker 9, the action of spring 16 carrying breaker point 11 causes points 11 and 12 to separate, which again opens circuit 10, thereby causing relay 13 to close lamp circuit 14, which in turn illuminates lamp 40 and beacon beam 15 to its original intensity. Gear train 3 is designed so that the rotation of cam 7 will always be synchronized with that of light beam 15. Make and break mechanism 4, being fixedly attached to rod 5, will always have a fixed relation with respect to the wind. Hence, cam 7 will operate on breaker 9 to reduce the intensity of beam 15 only when beam 15 has a predetermined relation with respect to the wind direction.

Now it is apparent from the drawing that the ratio of the gears in gear train 3 determines the frequency of the operation of the device as hereinbefore described. But, in order to insure the flash of the beam being visible in the direction of the wind, the sizes of the gears are shown in the drawing to indicate that the device will operate only once to every plurality of revolutions of the beacon. For instance, if the device operates so that beam 15 is interrupted when flashing directly down wind, and then only once in every three revolutions, it is apparent that an observer located directly down wind from the beacon would see two flashes of the beacon but would not see the third flash. Thus an observer would note the location of the beacon from the observed flashes, and would also note from the absence of the third flash that he was directly down wind from the beacon. However, should the observer, such as the pilot of an airplane, be above the beacon, he would be able to see the beam revolving and would also see the down wind interruption of the beam every third revolution.

Atmospheric conditions will prevail occasionally when there is a dead calm, and also when there is too little wind to affect the azimuth position of wind vane 6. Unless otherwise provided for, it is apparent such a condition would cause the device to operate as though there were a wind blowing from whichever direction wind vane 6 might be at rest. Obviously this would be a fault. In order to correct for this, a wind velocity indicator 17 is shown in Fig. 1 mounted upon rod 5 so as to be headed constantly into the wind by the action of wind vane 6, and designed, in the view shown in Fig. 1, to rotate upwardly in a clockwise direction as the wind velocity increases, and downwardly in a counter clockwise direction as the wind velocity decreases. The upper end of rod 19 is pivoted at 18 to the forward end 20 of wind velocity indicator 17, such that the rotation of wind velocity indicator 17 is transmitted by rod 19 to rod 21 which extends down the inside of rod 5 and out of opening 22 inside of base 2. The lower end 23 of rod 21 passes thru the upper end 24 of spring 16 (Figs. 2 and 3). It is apparent when wind velocity indicator 17 drops down to the dotted line position 25 due to calm air conditions (or due to the wind velocity dropping below a predetermined minimum), that rod 21 will be raised to the dotted line position indicated at 26 and that the spring end 24 of spring 16 will be raised off of electric contact post 27 to the dotted line position indicated at 28. As shown in the drawing, spring 16 forms the electric connection between breaker point 12 of contact brush 29 (Fig. 2), and electric contact post 27 of contact brush 30. Hence, when end 24 of spring 16 is raised off of contact post 27 as just described, circuit 10 is kept open and no interruption of the beam occurs during the revolutions of the beacon as it is not desired for the device to indicate a wind direction. Thus the drawing indicates a device for rendering the device inoperative under calm air conditions, or under conditions when the wind velocity has dropped below a predetermined minimum.

Fig. 2 shows the manner in which make and break mechanism 4 is connected to an electric circuit 10. Carbon brushes 29 and 30 are held by coiled springs 31 and 32 against circular segments 33 and 34, respectively, which segments are mounted in insulated post 35 and connected as indicated to battery 10a of circuit 10 by insulated electric wires 36 and 37, all respectively. Coiled springs 31 and 32, electrically connecting brushes 29 and 30 with breaker point 12 and contact post 27, respectively, enable circuit 10 to be closed when breaker points 11 and 12 are brought into contact by cam 7 as hereinbefore described. The electric parts of make and break mechanism 4 just described are shown mounted in insulating case 38 of make and break mechanism 4. Insulated post 35 is shown fixedly attached to base 2. As rod 5 rotates with the wind direction on its bearing 39, circuit 10 may be closed as hereinbefore described irrespective of the direction from which the wind may be blowing.

Fig. 4 shows the device designed as a separate attachment and mounted upon base 2 of revolving beacon 1. The drawing shows case 41 in cross-section of the attached device held by bolt 42 to base 2, with shaft 43 of gear train 3 extending thru the sides of case 41 and base 2 and establishing the operative relation of the device with revolving beacon 1 as hereinbefore described.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

I claim:

1. In combination, a beacon adapted to project a shaft of light in an other than vertical direction and including an electric lamp and circuit, means for revolving said beacon about a substantially vertical axis, and means responsive to changes in wind direction for affecting the current flow of the circuit when the beacon reaches a predetermined point in its revolution having a fixed relation with respect to the direction of the wind.

2. In combination, a beacon adapted to project a shaft of light and including an electric lamp and circuit, means for revolving the beacon about a substantially vertical axis, means responsive to changes in wind direction for affecting the current flow of the circuit when the beacon reaches a predetermined point in its revolution having a fixed relation with respect to the direction of the wind, and wind-responsive means for rendering the current flow affecting-means inoperative automatically when the wind velocity has a predetermined minimum value.

3. In combination, a beacon adapted to project a shaft of light and including an electric lamp and circuit, means for revolving the beacon about a substantially vertical axis, an interrupter electrically connected in the lamp circuit, and means responsive to changes in wind direction for actuating the interrupter to open the lamp circuit at a point in the revolution of the beacon having a fixed relation with respect to the direction of the wind.

4. In combination, a beacon adapted to project a shaft of light and including an electric lamp and circuit, means for revolving the beacon about a substantially vertical axis, an interrupter electrically connected in the lamp circuit, means responsive to changes in wind direction for actuating the interrupter to open the circuit momentarily and at a position in the revolution of the beacon when the light is projected in the direction of the wind, and wind-responsive means for rendering the interrupter-actuating means inoperative when the wind velocity falls below a predetermined minimum value.

5. In combination, a beacon adapted to project a shaft of light and including an electrical lamp circuit, means for revolving the beacon about a substantially vertical axis, an interrupter in the lamp circuit, and means responsive to changes in wind direction for actuating the interrupter to open the circuit during selected non-consecutive revolutions and at such time and for such period only in each selected revolution when the beacon light is projected in the direction of the wind.

6. In combination, a beacon adapted to project a shaft of light and including a normally closed light circuit, means for revolving the beacon about a substantially vertical axis, an interrupter for the light circuit including a relay adapted when energized to open the circuit, a normally open relay circuit, a pair of relatively spaced and movable terminal contacts in the relay circuit, means controlled by the revolving movement of the beacon for causing relative engagement of the contacts periodically to close the relay circuit, a movable support for said contacts, and means responsive to changes in wind direction for shifting the support to maintain the contacts in a fixed relation with respect to the direction of the wind.

7. In combination, a beacon adapted to project a shaft of light in an other than vertical direction and including a normally closed light circuit, means for revolving said beacon about a substantially vertical axis, a relay adapted when energized to open the light circuit, a normally open relay circuit including relatively spaced and movable contacts, means controlled by the revolving beacon to cause relative engagement of said contacts once during selected non-consecutive revolutions of the beacon to close the relay circuit, a rotatable support for the contacts, and means responsive to changes in wind direction for rotating the support to maintain the contacts in a fixed relation with respect to the direction of the wind.

8. In combination, a beacon adapted to project a shaft of light and including a normally closed light circuit, means for revolving said beacon about a substantially vertical axis, a relay adapted when energized to open the light circuit, a normally open relay circuit including relatively spaced and movable contacts, means controlled by the revolving movement of the beacon to cause relative engagement of the contacts periodically to close the relay circuit, means responsive to changes in wind direction for maintaining the contacts in a fixed relation with respect to the direction of the wind, and means responsive to changes in wind velocity for opening the relay circuit when the wind velocity falls below a predetermined minimum value.

9. A wind direction indicator comprising means for projecting a shaft of light in an other than vertical direction in a substantially horizontal plane, said means being revoluble about a substantially vertical axis and including an electric lamp and a normally closed lamp circuit, means for momentarily opening the lamp circuit, and means responsive to changes in wind direction for effecting actuation of the circuit-opening means at the moment when the path of the light is in the same direction as the wind.

In testimony whereof I affix my signature.

BYRON Q. JONES.